United States Patent
Ohnishi et al.

(10) Patent No.: US 10,263,459 B2
(45) Date of Patent: Apr. 16, 2019

(54) POWER SUPPLY SYSTEM

(75) Inventors: Keisuke Ohnishi, Tokyo (JP); Hiroshi Masunaga, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 687 days.

(21) Appl. No.: 14/416,308

(22) PCT Filed: Jul. 25, 2012

(86) PCT No.: PCT/JP2012/068844
§ 371 (c)(1),
(2), (4) Date: Mar. 20, 2015

(87) PCT Pub. No.: WO2014/016919
PCT Pub. Date: Jan. 30, 2014

(65) Prior Publication Data
US 2015/0207362 A1     Jul. 23, 2015

(51) Int. Cl.
| H02J 1/00 | (2006.01) |
| H02J 3/00 | (2006.01) |
| H02J 7/00 | (2006.01) |
| H02J 9/06 | (2006.01) |

(52) U.S. Cl.
CPC ............ *H02J 9/062* (2013.01); *Y10T 307/62* (2015.04)

(58) Field of Classification Search
CPC ................................ H02J 9/062; Y10T 307/62
USPC ........................................................ 307/64, 65
See application file for complete search history.

(56) References Cited

U.S. PATENT DOCUMENTS

| 5,745,355 A | * | 4/1998 | Tracy | ........................ | H02J 3/38 |
| | | | | | 323/272 |
| 2009/0072623 A1 | * | 3/2009 | Liao | ........................ | H02J 9/061 |
| | | | | | 307/65 |
| 2012/0013193 A1 | | 1/2012 | Sato et al. | | |
| 2012/0026764 A1 | * | 2/2012 | Giuntini | ................. | H02J 9/005 |
| | | | | | 363/69 |

(Continued)

FOREIGN PATENT DOCUMENTS

| JP | 8 289485 | 11/1996 |
| JP | 10 70853 | 3/1998 |

(Continued)

OTHER PUBLICATIONS

Office Action dated May 23, 2016 in Korean Patent Application No. 10-2015-7002191 (with English language translation).

(Continued)

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

A power supply system includes a plurality of uninterruptible power supplies provided for a load in parallel. The uninterruptible power supplies each include a power supply unit configured to supply the load with power and being larger in capacitance than the load, and a switch provided between the power supply unit and the load. The power supply system further includes a control unit selecting a first uninterruptible power supply of the plurality of uninterruptible power supplies, and setting the switch of the first uninterruptible power supply to the on state.

5 Claims, 7 Drawing Sheets

(56) References Cited

U.S. PATENT DOCUMENTS

2013/0193761 A1* 8/2013 Colombi .................. H02J 3/46
                                                           307/64

FOREIGN PATENT DOCUMENTS

| | | |
|---|---|---|
| JP | 2005 33890 | 2/2005 |
| JP | 2005-229694 A | 8/2005 |
| JP | 2006-288142 A | 10/2006 |
| JP | 4102350 B2 | 6/2008 |
| JP | 2009 100618 | 5/2009 |
| JP | 2010 93949 | 4/2010 |
| KR | 10-2011-0118824 A | 11/2011 |

OTHER PUBLICATIONS

Office Action dated Nov. 10, 2016 in Korean Patent Application No. 10-2015-7002191 with English translation.
International Search Report dated Apr. 16, 2013 in PCT/JP12/068844 Filed Jul. 25, 2012.
Office Action dated Nov. 29, 2016 in Japanese Patent Application No. 2014-526654 (with English translation).
Office Action dated Jan. 2, 2017 in Korean Patent Application No. 10-2015-7002191 (with English translation).
Office Action dated Feb. 27, 2017 in Chinese Patent Application No. 201280074904.8 (with English language translation).
Office Action dated Apr. 19, 2017 in Korean Patent Application No. 10-2017-7002481 (with English language translation).
Korean Office Action dated Aug. 25, 2017 in Korean Patent Application No. 10-2017-7002481 (with English translation).
Chinese Office Action dated Jan. 4, 2018 in Chinese Patent Application No. 201280074904.8 (with English translation).
Office Action dated May 29, 2018 in Chinese Patent Application No. 201280074904.8 with English translation.

* cited by examiner

POWER SUPPLY SYSTEM

TECHNICAL FIELD

The present invention relates to a power supply system. More specially, the present invention relates to a power supply system including a plurality of power supplies.

BACKGROUND ART

An uninterruptible power supply is used to allow a load to receive power without interruption. To increase capacitance and improve reliability, there has been proposed a power supply system including a plurality of uninterruptible power supplies connected to a load in parallel.

For example, Japanese Patent Laying-Open No. 2009-100618 (PTD 1) discloses a method for controlling a plurality of uninterruptible power supplies in parallel. More specially, each uninterruptible power supply outputs a current and a voltage, which are controlled in accordance with a current that the uninterruptible power supply should supply to the load.

For example, Japanese Patent Laying-Open No. 2005-033890 (PTD 2) discloses a method for controlling a system including a plurality of uninterruptible power supplies. Each uninterruptible power supply includes a synchronous control circuit. The synchronous control circuit receives a voltage from a commercial power supply and converts the received voltage into a current. When the plurality of uninterruptible power supplies have power supply voltages with a phase difference, a reference voltage based on the current is generated for correcting an output voltage. Each uninterruptible power supply corrects its output voltage with reference to the reference voltage.

CITATION LIST

Patent Documents

PTD 1: Japanese Patent Laying-Open No. 2009-100618
PTD 2: Japanese Patent Laying-Open No. 2005-033890

SUMMARY OF INVENTION

Technical Problem

The above system is configured on the assumption that the plurality of uninterruptible power supplies are operated in parallel. Accordingly, if a single uninterruptible power supply can alone supply the load with power, the plurality of uninterruptible power supplies nonetheless operate in parallel. Operating the plurality of uninterruptible power supplies in parallel may impair the system in efficiency.

An object of the present invention is to enhance in efficiency a power supply system including a plurality of uninterruptible power supplies.

Solution to Problem

The present invention in one aspect provides a power supply system including a plurality of uninterruptible power supplies provided for a load in parallel. The plurality of uninterruptible power supplies each include a power supply unit and a switch. The power supply unit is configured to supply the load with power and is larger in capacitance than the load. The switch is provided between the power supply unit and the load. The power supply system further includes a control unit selecting one uninterruptible power supply of the plurality of uninterruptible power supplies, and setting the switch of the selected uninterruptible power supply to the on state.

Advantageous Effect of Invention

The present invention can thus enhance in efficiency a power supply system including a plurality of uninterruptible power supplies.

DESCRIPTION OF EMBODIMENTS

Hereinafter reference will be made to the drawings to describe the present invention in embodiments. Note that in the figures, identical or corresponding components are identically denoted and will not be described repeatedly.

First Embodiment

Figure 1:
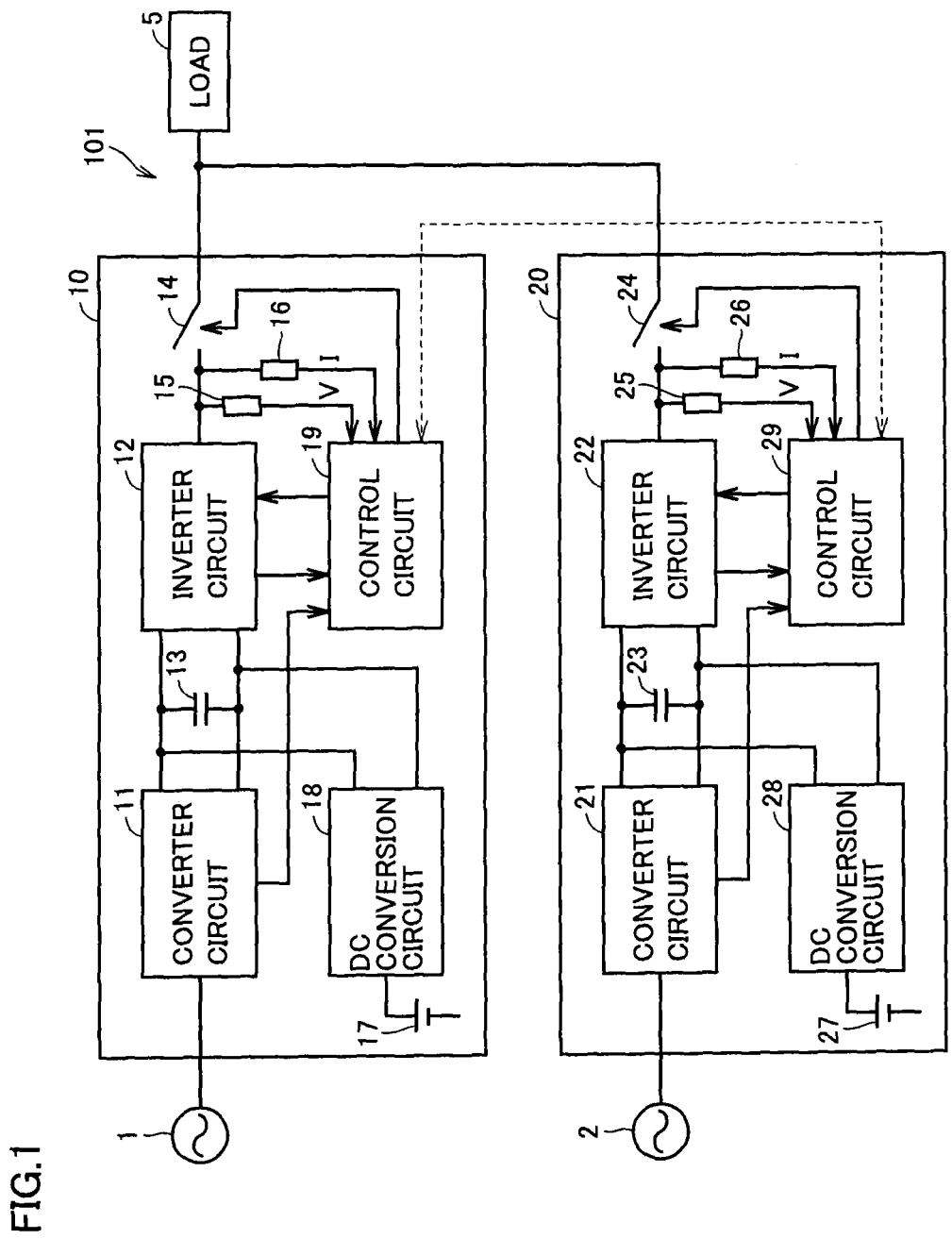
FIG. 1 is a block diagram showing a configuration of a power supply system according to a first embodiment of the present invention.

FIG. 1 is a block diagram showing a configuration of a power supply system according to a first embodiment of the present invention. With reference to FIG. 1, a power supply system 101 includes uninterruptible power supplies 10 and 20. Uninterruptible power supplies 10 and 20 are provided for a load 5 in parallel. Load 5 is an alternating current (ac) load.

Uninterruptible power supplies 10 and 20 are identical in configuration. Hereinafter, uninterruptible power supply 10 will representatively be described in configuration. Uninterruptible power supply 10 includes a converter circuit 11, an inverter circuit 12, a capacitor 13, a switch 14, a voltage sensor 15, a current sensor 16, a direct current (dc) power supply 17, a dc conversion circuit 18, and a control circuit 19.

Converter circuit 11 receives ac power from an ac power supply 1 and converts it into dc power. Inverter circuit 12 converts dc power into ac power. Capacitor 13 smoothes dc power that is input to inverter circuit 12.

Switch 14 is controlled by control circuit 19. When switch 14 turns on, inverter circuit 12 is electrically connected to load 5.

Voltage sensor 15 senses a voltage that inverter circuit 12 outputs. Voltage sensor 15 transmits a signal indicating a voltage V that it has sensed to control circuit 19. Current sensor 16 senses a current that inverter circuit 12 outputs. Current sensor 16 transmits a signal indicating a current I that it has sensed to control circuit 19.

Dc power supply 17 is a storage battery, for example. Dc power supply 17 supplies inverter circuit 12 with dc power when ac power supply 1 has failed. When ac power supply 1 supplies ac power, dc power supply 17 stores a portion of dc power output from converter circuit 11. Dc conversion circuit 18 converts a voltage of dc power supply 17 and a voltage input to inverter circuit 12 mutually.

Control circuit 19 controls switch 14. Furthermore, control circuit 19 controls inverter circuit 12, based on the value of the voltage sensed by voltage sensor 15 and the value of the current sensed by current sensor 16. Control circuit 19 may also control converter circuit 11.

When switch 14 is in the on state, control circuit 19 determines whether the sensed voltage and the sensed current both present normal values, respectively. When at least one of the sensed voltage and the sensed current presents a value indicating an error, control circuit 19 turns off switch 14. Furthermore, control circuit 19 monitors the state of converter circuit 11 and that of inverter circuit 12. When at least one of converter circuit 11 and inverter circuit 12 presents an error, control circuit 19 also turns off switch 14.

Uninterruptible power supply 20 includes a converter circuit 21, an inverter circuit 22, a capacitor 23, a switch 24, a voltage sensor 25, a current sensor 26, a dc power supply 27, a dc conversion circuit 28, and a control circuit 29. Each element is identical in function to the corresponding element of uninterruptible power supply 10, and accordingly, it will not be described repeatedly in detail. Note that, in this embodiment, converter circuit 21 is connected to an ac power supply 2.

Control circuits 19 and 29 configure a "control unit" in the present invention. The FIG. 1 configuration provides each uninterruptible power supply with a control circuit. Control circuit 19 and control circuit 29 communicate with each other. Control circuit 19 and control circuit 29 share information of the state of each of switches 14 and 24. Control circuits 19 and 29 may be unified into a single control circuit.

Figure 2:
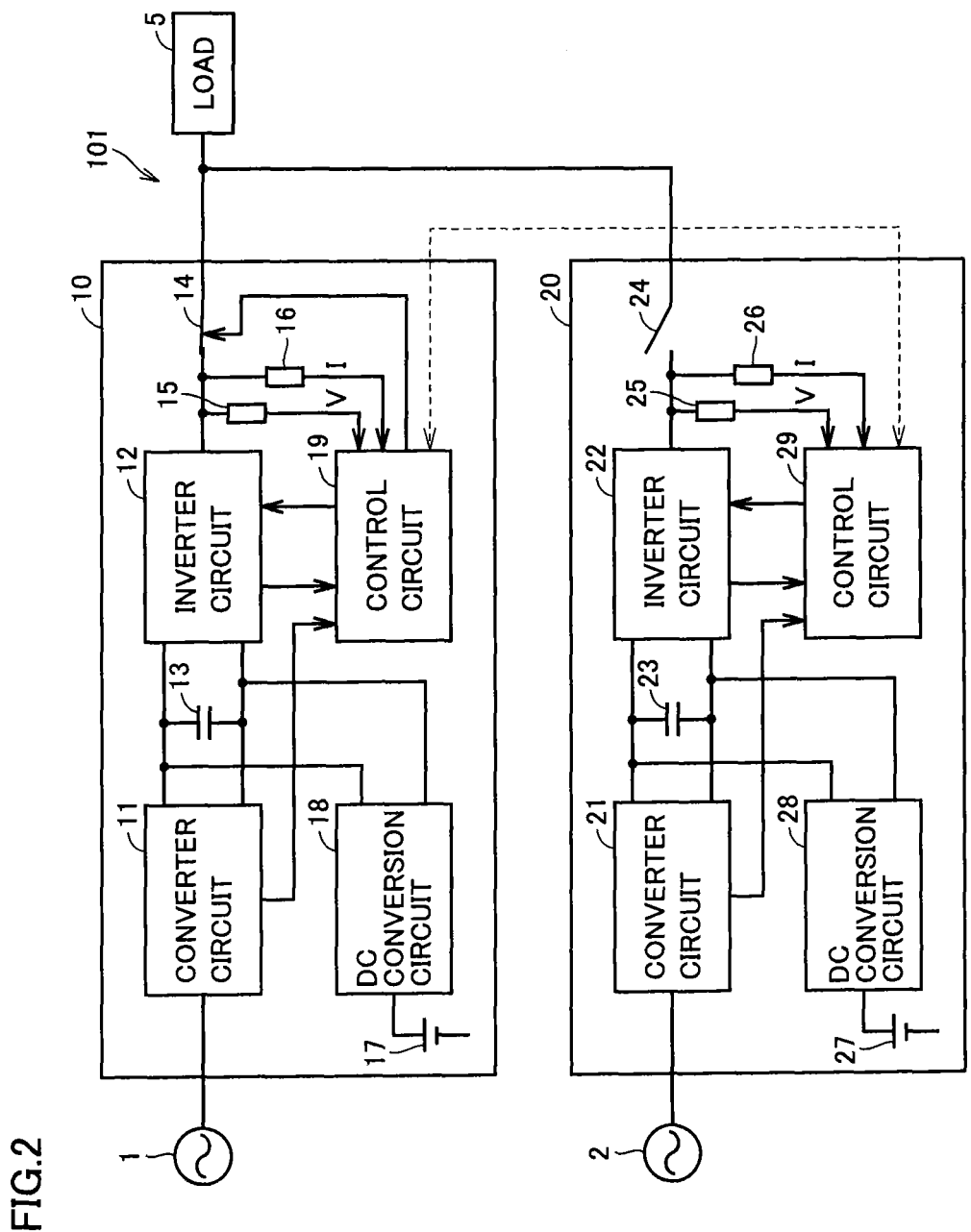
FIG. 2 is a diagram for illustrating how a power supply system 101 operates when uninterruptible power supplies 10 and 20 are normal.

FIG. 2 is a diagram for illustrating how power supply system 101 operates when uninterruptible power supplies 10 and 20 are normal. With reference to FIG. 2, control circuits 19 and 29 select uninterruptible power supply 10 of uninterruptible power supplies 10 and 20 as a power supply that should supply load 5 with power. For example, an initial setting may be followed to select uninterruptible power supply 10 when power supply system 101 is activated. In that case, initially, uninterruptible power supplies 10 and 20 are both activated. Subsequently, control circuit 19 turns on switch 14. Once switch 14 has turned on, inverter circuit 12 is electrically connected to load 5. Uninterruptible power supply 10 is thus placed in an operating state. In other words, uninterruptible power supply 10 supplies load 5 with power.

Control circuit 29 holds switch 24 off. Uninterruptible power supply 20 in effect does not supply load 5 with power. However, uninterruptible power supply 20 stands by in a state capable of supplying load 5 with power. This state will hereafter be referred to as a "standby state".

Control circuit 19 generates a voltage control value and a current control value for controlling inverter circuit 12. The values of the voltage and current sensed by voltage sensor 15 and current sensor 16, respectively, are fed back to control circuit 19. Control circuit 19 generates a control signal, based on a difference between the voltage control value and the sensed voltage's value and a difference between the current control value and the sensed current's value, for controlling inverter circuit 12. Control circuit 19 transmits the control signal to inverter circuit 12. Note that inverter circuit 12 can be controlled in a known control system such as pulse width modulation (PWM) for example.

Inverter circuit 12 is larger in capacitance than load 5. Accordingly, inverter circuit 12 can alone supply load 5 with ac power. Converter circuit 11 has a capacitance determined in accordance with that of inverter circuit 12.

Control circuit 19 determines whether uninterruptible power supply 10 is normal. More specifically, control circuit 19 determines whether the sensed voltage and the sensed current both present normal values, respectively. Furthermore, control circuit 19 determines whether converter circuit 11 and inverter circuit 12 are both normal. When the sensed current and the sensed voltage both present normal values, respectively, and converter circuit 11 and inverter circuit 12 are also both normal, control circuit 19 allows uninterruptible power supply 10 to continue to operate.

Figure 3:
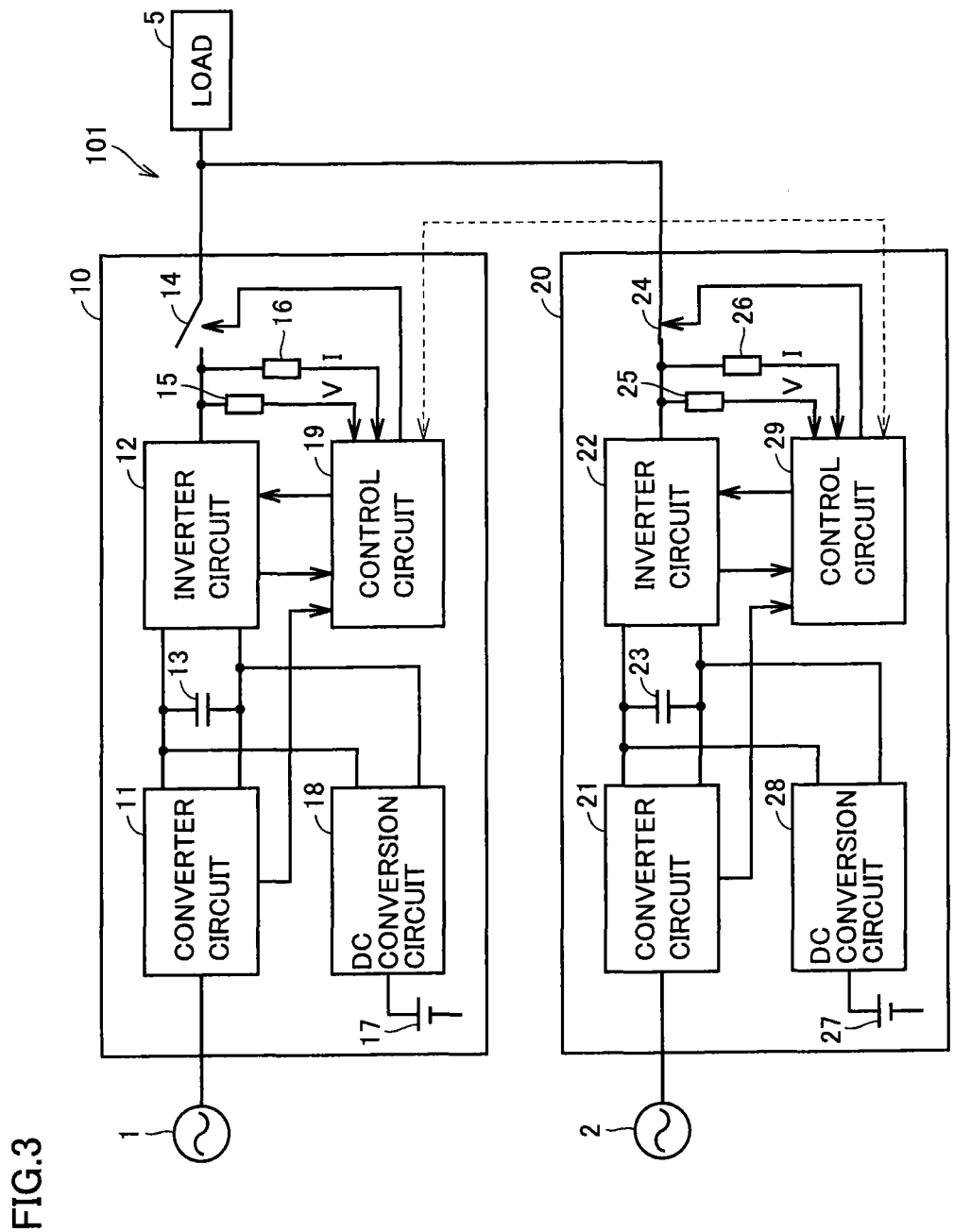
FIG. 3 is a diagram for illustrating how power supply system 101 operates when uninterruptible power supply 10 presents an error.

FIG. 3 is a diagram for illustrating how power supply system 101 operates when uninterruptible power supply 10 presents an error. With reference to FIG. 3, when voltage sensor 15 senses a voltage having a value indicating an error and/or current sensor 16 senses a current having a value indicating an error, control circuit 19 turns off switch 14. For example, when inverter circuit 12 outputs a voltage having distortion or outputs a current having rapid variation, there is a possibility that the sensed current's value and/or the value of the current sensed by current sensor 16 may present an error. In that case, control circuit 19 turns off switch 14. Alternatively, when at least one of converter circuit 11 and inverter circuit 12 presents an error, control circuit 19 turns off switch 14. Control circuit 19 transmits to control circuit 29 information indicating that switch 14 is in the off state.

Control circuit 29 receives the information from control circuit 19 and uses it to set switch 24 to the on state. This places uninterruptible power supply 20 in the operating state. In other words, uninterruptible power supply 10 is replaced by uninterruptible power supply 20 to supply load 5 with power. Inverter circuit 22 is greater than or equal to load 5 in capacitance. Accordingly, inverter circuit 22 can alone supply load 5 with power. Preferably, switches 14 and 24 are controlled so that load 5 receives power without interruption.

Figure 4:
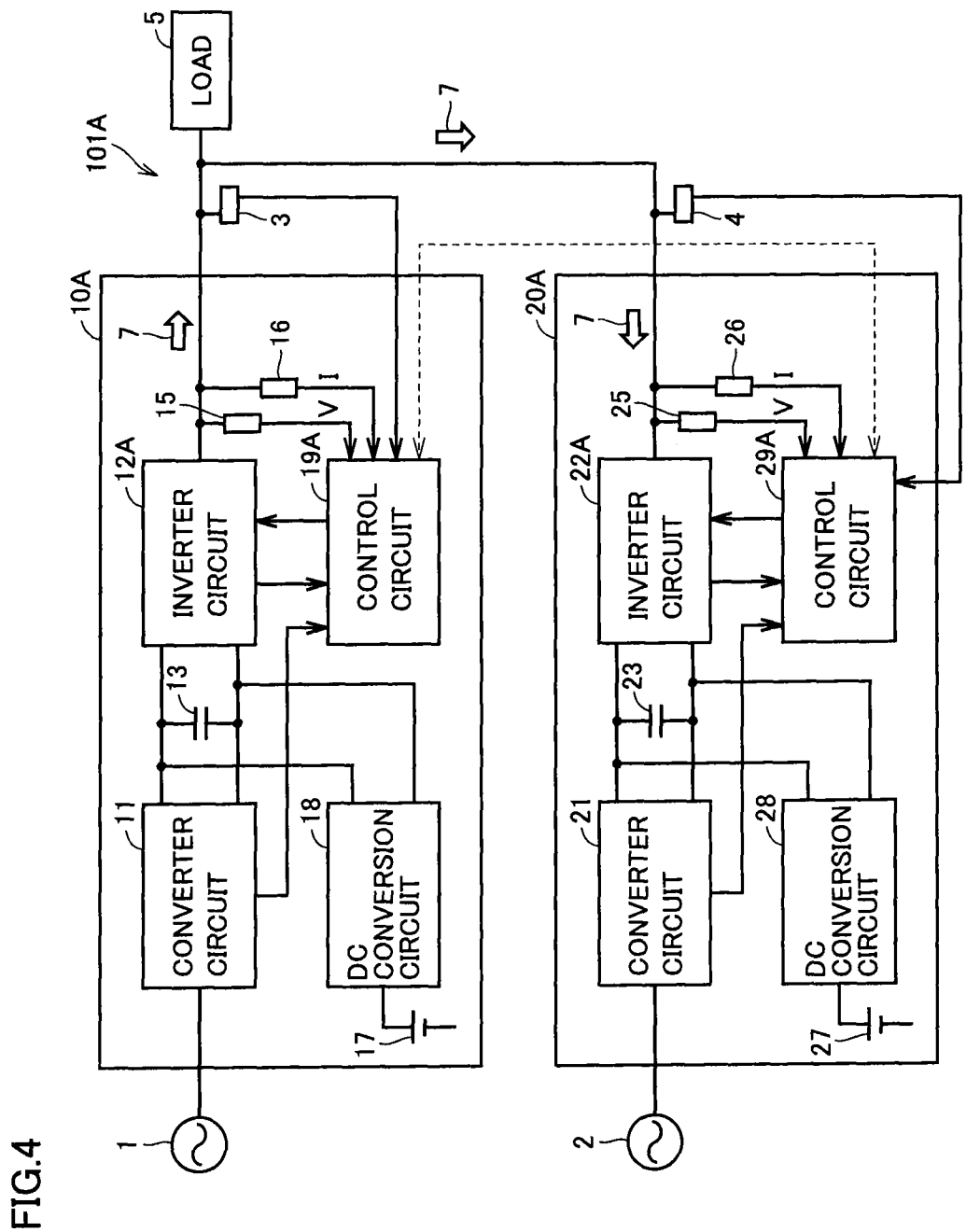
FIG. 4 is a diagram showing a configuration of a comparative example of a power supply system according to the first embodiment.

FIG. 4 is a diagram showing a configuration of a comparative example of a power supply system according to the first embodiment. With reference to FIG. 4, a power supply system 101A includes uninterruptible power supplies 10A and 20A. Uninterruptible power supply 10A includes an inverter circuit 12A. Inverter circuit 12A is controlled by a control circuit 19A. Uninterruptible power supply 20A includes an inverter circuit 22A. Inverter circuit 22A is controlled by a control circuit 29A. Inverter circuits 12A and 22A are each smaller in capacitance than load 5. To supply load 5 with power, uninterruptible power supplies 10A and 20A are operated in parallel. Note that uninterruptible power supplies 10A and 20A have the remainder similar in configuration to that of uninterruptible power supplies 10 and 20.

Uninterruptible power supplies 10A and 20A both supply load 5 with ac power. Inverter circuits 12A and 22A are controlled to provide ac powers having effective values and phases in synchronization. However, for example, inverter circuits 12A and 22A may have an output path having an impedance component or a similar factor causing inverter circuits 12A and 22A to output voltages, respectively, with a phase difference therebetween. This phase difference causes an electric cross current between inverter circuits 12A and 22A. As shown in FIG. 4, for example, an electric cross current 7 is output from inverter circuit 12A and input to inverter circuit 22A at an ac side. When electric cross current 7 arises, inverter circuits 12A and 22A pass an increased current. Accordingly, power supply system 101A provides an increased loss.

To reduce the electric cross current, power supply system 101A includes current sensors 3 and 4. Current sensor 3 is disposed on a current path between uninterruptible power supply 10A and load 5. Current sensor 4 is disposed on a current path between uninterruptible power supply 20A and load 5. In other words, each uninterruptible power supply is provided with a current sensor. Control circuit 19A receives a value of a current sensed by current sensor 3. Control circuit 29A receives a value of a current sensed by current sensor 4. Control circuits 19A and 29A each use the received value to generate a current control value to reduce the electric cross current.

The FIG. 4 configuration requires a current sensor between an uninterruptible power supply and load 5. Furthermore, control circuits 19A and 29A are each required to calculate a current control value to reduce an electric cross current.

In the first embodiment, in contrast, uninterruptible power supplies 10 and 20 have one thereof (e.g., uninterruptible power supply 10) selected. The selected uninterruptible power supply has a switch thereof set to the on state. The other uninterruptible power supply (e.g., uninterruptible power supply 20) has a switch thereof set to the off state. A single uninterruptible power supply supplies load 5 with power, and there is no substantial electric cross current generated.

A configuration for reducing an electric cross current can thus be dispensed with. In other words, current sensors 3 and 4 shown in FIG. 4 can be dispensed with. As current sensors 3 and 4 can be dispensed with, the power supply system's cost can accordingly be reduced. Furthermore, no control required to reduce the electric cross current allows control circuits 19 and 29 to provide simplified control.

Furthermore, in the first embodiment, when uninterruptible power supply 10 is in operation, and voltage sensor 15 also senses a voltage having a value indicating an error and/or current sensor 16 also senses a current having a value indicating an error, uninterruptible power supply 20 is selected. Alternatively, when uninterruptible power supply 10 is in operation, and inverter circuit 12 and/or converter circuit 11 also present/presents an error, uninterruptible power supply 20 is selected. In that case, uninterruptible power supply 10 has switch 14 set to the off state and uninterruptible power supply 20 has switch 24 set to the on state. When uninterruptible power supply 10 presents an error, uninterruptible power supply 20 supplies load 5 with power. Load 5 can thus receive power without interruption.

Note that, in the above description, uninterruptible power supply 10 first supplies load 5 with power. However, uninterruptible power supply 20 may first supply load 5 with power. In such a configuration, when uninterruptible power supply 20 presents an error, it is replaced by uninterruptible power supply 10 to supply load 5 with power.

Second Embodiment

Figure 5:
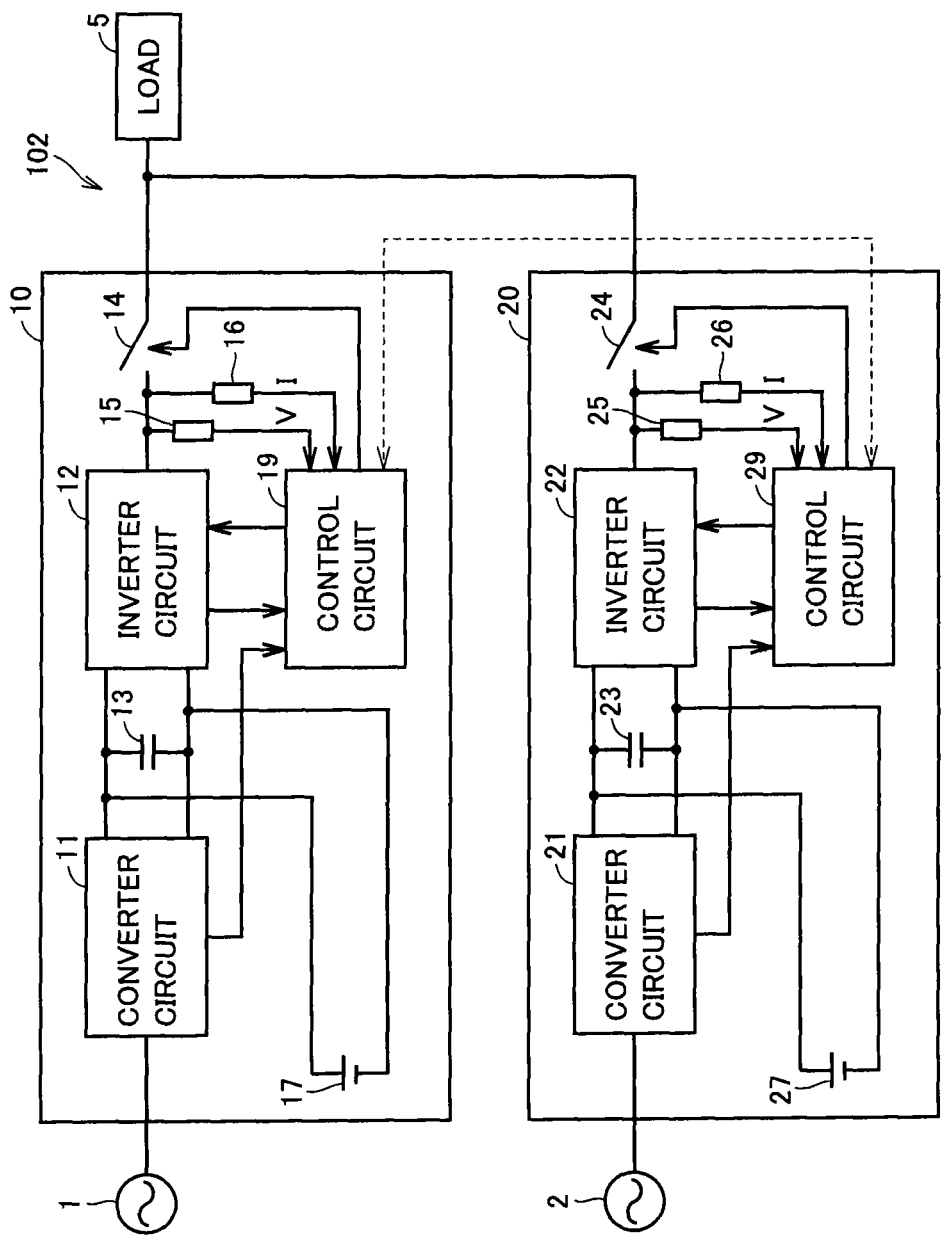
FIG. 5 is a block diagram showing a configuration of a power supply system according to a second embodiment of the present invention.

FIG. 5 is a block diagram showing a configuration of a power supply system according to a second embodiment of the present invention. With reference to FIG. 1 and FIG. 5, a power supply system 102 is different from power supply system 101 in that dc conversion circuits 18 and 28 are removed. Inverter circuit 12 receives dc power having a voltage substantially equal to that of dc power supply 17. Similarly, inverter circuit 22 receives dc power having a voltage substantially equal to that of dc power supply 27. Accordingly, dc conversion circuits 18 and 28 can be dispensed with.

Note that power supply system 102 has the remainder similar in configuration to that of power supply system 101 and accordingly, will not be described repeatedly. The second embodiment can be as effective as the first embodiment.

Third Embodiment

Figure 6:
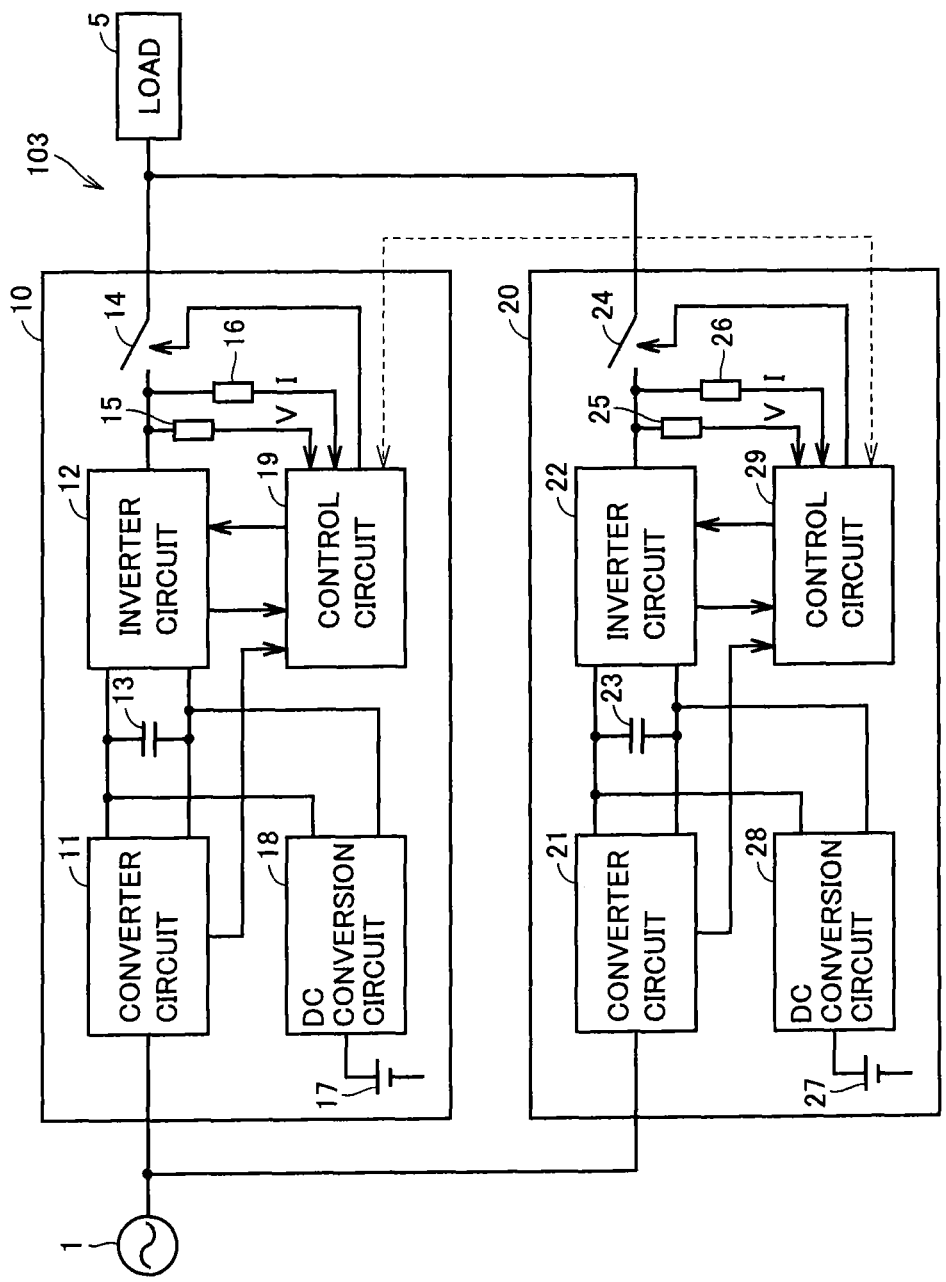
FIG. 6 is a block diagram showing a configuration of a power supply system according to a third embodiment of the present invention.

FIG. 6 is a block diagram showing a configuration of a power supply system according to a third embodiment of the present invention. With reference to FIG. 1 and FIG. 6, a power supply system 103 is different from power supply system 101 in that uninterruptible power supplies 10 and 20 are connected to ac power supply 1 in common. The third embodiment can be as effective as the first embodiment.

Note that if inverter circuit 12 receives dc power having a voltage substantially equal to that of dc power supply 17, uninterruptible power supply 10 may have dc conversion circuit 18 removed therefrom. Similarly, if inverter circuit 22 receives dc power having a voltage substantially equal to that of dc power supply 27, uninterruptible power supply 20 may have dc conversion circuit 28 removed therefrom.

Fourth Embodiment

Figure 7:
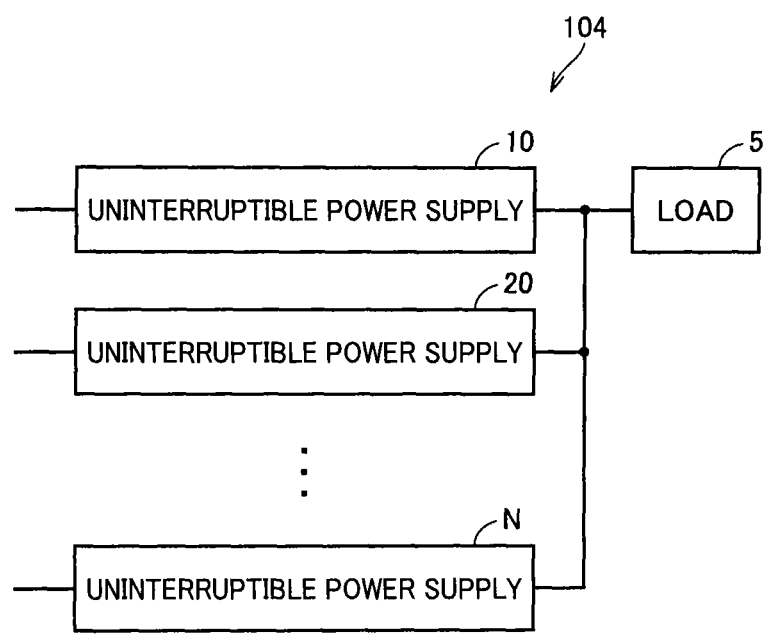
FIG. 7 is a block diagram showing a configuration of a power supply system according to a fourth embodiment of the present invention.

FIG. 7 is a block diagram showing a configuration of a power supply system according to a fourth embodiment of the present invention. With reference to FIG. 7, a power supply system 104 includes three or more uninterruptible power supplies. Each uninterruptible power supply is similar in configuration to that shown in FIG. 1 or 5. Uninterruptible power supplies 10, 20, . . . , N may be connected to a common ac power supply. Alternatively, uninterruptible power supplies 10, 20, . . . , N may be connected to individual ac power supplies.

Uninterruptible power supplies 10, 20, . . . , N have one thereof selected. The selected uninterruptible power supply has a switch thereof set to the on state. The other uninterruptible power supplies are set in a non-operating state by their respective control circuits. More specifically, the other uninterruptible power supplies have their respective switches set to the off state.

In one embodiment, power supply system 104 operates as follows: A plurality of uninterruptible power supplies are previously assigned an order for operation. The control circuits follow the order to shift their respective uninterruptible power supplies from the non-operating state through the standby state to the operating state. The "non-operating state" is for example a state that an uninterruptible power supply assumes when it is not powered on.

For example, once power supply system 104 has been activated, the uninterruptible power supply 10 control circuit sets the switch to the on state. Uninterruptible power supply 20 is in the standby state. Any uninterruptible power supply other than uninterruptible power supplies 10 and 20 is set by a control circuit to the non-operating state.

When uninterruptible power supply 10 presents an error, uninterruptible power supply 10 has its switch turned off and uninterruptible power supply 20 has its switch turned on. As uninterruptible power supply 20 has its switch turned on, a following uninterruptible power supply (e.g., uninterruptible power supply N) is selected. The selected uninterruptible power supply's control circuit sets its associated uninterruptible power supply to the standby state. Note that the above control is an example, and when uninterruptible power supply 10 is the operating state, the other uninterruptible power supplies may all be in the standby state.

As has been described in the first embodiment, control for reducing/preventing an electric cross current requires that each uninterruptible power supply be provided with a current sensor. As more uninterruptible power supplies are introduced, more current sensors are accordingly required. The fourth embodiment can dispense with control for reducing/preventing the electric cross current. When the fourth embodiment is compared with operating a plurality of uninterruptible power supplies in parallel, the former can reduce the power supply system's cost significantly and significantly simplify controlling the power supply system.

It should be understood that the embodiments disclosed herein have been described for the purpose of illustration only and in a non-restrictive manner in any respect. The scope of the present invention is defined by the terms of the claims, rather than the embodiment described above, and is intended to include any modifications within the meaning and scope equivalent to the terms of the claims.

REFERENCE SIGNS LIST 1, 2: ac power supply; 3, 4, 16, 26: current sensor; 5: load; 7: electric cross current; 10, 20, 10A, 20A, N: uninterruptible power supply; 11, 21: converter circuit; 12, 12A, 22, 22A: inverter circuit; 13, 23: capacitor; 14, 24: switch; 15, 25: voltage sensor; 17, 27: dc power supply; 18, 28: dc conversion circuit; 19, 19A, 29, 29A: control circuit; 101, 101A, 102, 103, 104: power supply system.

The invention claimed is:

1. A power supply system, comprising:
a plurality of uninterruptible power supplies provided for a load in parallel, said plurality of uninterruptible power supplies each including:
a power supply circuit configured to supply said load with power and being larger in capacitance than said load;
a switch provided between said power supply circuit and said load;
a voltage sensor configured to sense a voltage supplied to said load and transmit a voltage sensor signal indicating the sensed voltage to a control circuit;
a current sensor configured to sense a current supplied to said load and transmit a current sensor signal indicating the sensed current to said control circuit; and
the control circuit configured to, based on the voltage sensor signal and the current sensor signal, select a first uninterruptible power supply of said plurality of uninterruptible power supplies, and set said switch of said first uninterruptible power supply to an on state, wherein
said load is an alternating current load;
said power supply circuit is an inverter circuit converting direct current power into alternating current power;
said plurality of uninterruptible power supplies each include said voltage sensor sensing a voltage output by said inverter circuit, and
said current sensor sensing a current output by said inverter circuit; and
said control circuit controls said inverter circuit of said first uninterruptible power supply, based on a voltage value of a voltage sensed by said voltage sensor of said first uninterruptible power supply and a current value of a current sensed by said current sensor of said first uninterruptible power supply,
when the current value of the current sensed indicates an error, said control circuit sets said switch of said first uninterruptible power supply to an off state and sets said switch of a second uninterruptible power supply of said plurality of uninterruptible power supplies to the on state, and
said control circuit of said first uninterruptible power supply and another control circuit of said second uninterruptible power supply communicate with each other, and share first information of a first state of said switch of said first uninterruptible power supply and second information of a second state of said switch of said second uninterruptible power supply.

2. The power supply system according to claim 1, wherein:
said plurality of uninterruptible power supplies each further include a converter circuit receiving alternating current power from an alternating current power supply, converting said alternating current power into said direct current power, and supplying said inverter circuit with said direct current power; and
when said control circuit detects that in said first uninterruptible power supply at least one of said converter circuit and said inverter circuit presents an error, said control circuit selects said second uninterruptible power supply of said plurality of uninterruptible power supplies.

3. The power supply system according to claim 2, wherein:
said plurality of uninterruptible power supplies further include a third uninterruptible power supply; and
said control circuit sets said third power supply to a non-operating state when said first uninterruptible power supply is in operation, and said control circuit sets said third uninterruptible power supply to a standby state when said second uninterruptible power supply is in operation.

4. The power supply system according to claim 1, wherein:
when said voltage sensor detects that said inverter circuit outputs a voltage having a distortion, or when said current sensor detects that said inverter circuit outputs a current having a rapid variation, said control circuit sets said switch of said first uninterruptible power supply to the off state and sets said switch of said second uninterruptible power supply to the on state.

5. The power supply system according to claim 1, wherein:
inputs of said plurality of uninterruptible power supplies are connected with each other.

* * * * *